(12) United States Patent
Hirayama

(10) Patent No.: US 10,412,946 B2
(45) Date of Patent: Sep. 17, 2019

(54) SPINNING REEL FOR FISHING

(71) Applicant: Shimano Inc., Sakai, Osaka (JP)

(72) Inventor: Hirokazu Hirayama, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 72 days.

(21) Appl. No.: 15/820,697

(22) Filed: Nov. 22, 2017

(65) Prior Publication Data

US 2018/0199555 A1  Jul. 19, 2018

(30) Foreign Application Priority Data

Jan. 19, 2017 (JP) ................. 2017-007267

(51) Int. Cl.
*A01K 89/01* (2006.01)
*A01K 89/015* (2006.01)

(52) U.S. Cl.
CPC .. *A01K 89/01928* (2015.05); *A01K 89/01925* (2015.05); *A01K 89/01931* (2015.05)

(58) Field of Classification Search
CPC ............. A01K 89/0128; A01K 89/01931
See application file for complete search history.

(56) References Cited

U.S. PATENT DOCUMENTS

| 4,106,718 A * | 8/1978 | Catignani | A01K 89/0111 242/246 |
| 4,778,124 A * | 10/1988 | Shinohara | A01K 89/01081 242/230 |
| 5,318,247 A * | 6/1994 | Sugawara | A01K 89/0111 242/319 |
| 5,356,091 A * | 10/1994 | Sugawara | A01K 89/01 242/319 |
| 5,573,193 A * | 11/1996 | Bernard | A01K 89/0111 242/319 |
| 5,615,841 A * | 4/1997 | Saito | A01K 89/0111 242/231 |
| 5,615,843 A * | 4/1997 | Takeuchi | A01K 89/01 242/319 |
| 5,676,326 A * | 10/1997 | Carpenter | A01K 89/0111 242/319 |
| 2009/0200412 A1* | 8/2009 | Hoshi | A01K 89/0111 242/243 |

FOREIGN PATENT DOCUMENTS

| JP | 3761490 B2 | 3/2006 |
| JP | 2007289055 A * | 11/2007 |
| JP | 2008118918 A | 5/2008 |

* cited by examiner

*Primary Examiner* — Emmanuel M Marcelo
(74) *Attorney, Agent, or Firm* — United IP Counselors, LLC

(57) ABSTRACT

A spinning reel for fishing includes: a rotor including a cylindrical portion and a pair of support arms; a spool including a bobbin trunk, a front flange and a rear flange disposed on front and rear ends of the bobbin trunk respectively; and a line safety guard configured to prevent entry of a fishing line into the spool. The line safety guard has a base end portion, connecting frames proximally extending radially outward from the base end portion, and an annular portion consecutively connected to the distal ends of the connecting frames. The annular portion has an outer peripheral surface that is disposed to face an inner peripheral surface of the rear flange, and a gap is open between the inner peripheral surface of the rear flange and the outer periphery of the annular portion, in an axial direction.

7 Claims, 3 Drawing Sheets

SPINNING REEL FOR FISHING

CROSS-REFERENCE TO RELATED APPLICATIONS

This application claims priority to Japanese Patent Application No. 2017-007267, filed on Jan. 19, 2017. The contents of that application are herein incorporated by reference in their entirety.

BACKGROUND

Technical Field

The present disclosure relates to a spinning reel for fishing that includes a line safety guard capable of preventing entry of a fishing line into inside of a spool.

Background Art

A conventional spinning reel for fishing includes: a rotor constituted by a cylindrical portion and a pair of support arms supporting a bail support member; and a spool that includes a bobbin trunk provided with flange portions on the front and rear ends of the bobbin trunk respectively and that moves in accordance with rotation of the rotor reciprocally in a direction of the rotational shaft of the rotor, and is configured such that a fishing line can be wound around the spool when the rotor rotates. It has been known that such a spinning reel for fishing includes a line safety guard to prevent the fishing line from dropping out rearward of the rear flange of the spool.

Various configurations for the line safety guard have been conventionally known. For example, Japanese Patent Application Publication 2008-118918 describes a line safety guard that is provided on a rear flange of a spool and includes a plurality of tapered portions and circumferential grooves provided at a rear end outer circumferential portion of a cylindrical skirt portion that protrudes toward a reel body in such a way to prevent a fishing line from dropping out rearward of the rear flange.

Further, Japanese Patent No. 3761490 describes another line safety guard that includes a first annular portion, a second annular portion positioned on a radially outer side of the first annular portion, a wall-like portion connecting the first annular portion and the second annular portion, and engaging portions protruding radially outward from the second annular portion to be engaged with engaging grooves on a support arm of a rotor. The first annular portion is located inside a skirt portion of a spool, and the second annular portion is located closer to a reel body than to a rear edge of the skirt portion. An outer peripheral surface of the second annular portion and an outer peripheral surface of the skirt portion are substantially coplanar. The wall-like portion is spaced from a base end of the engaging portion by a length L in the axial direction. In this configuration, even when a fishing line drops out rearward of the rear flange of the spool, the dropping line can be stopped by the engaging portion that is formed in such a way to protrude from the rear end of the outer peripheral surface of the second annular portion on the reel body side. At the position where the fishing line is stopped, there is no gap that enables the fishing line to enter inside of the spool, but the outer peripheral surface of the second annular portion exists, which thereby prevents the fishing line from entering inside of the spool and getting entangled.

BRIEF SUMMARY

According to the line safety guard discussed in Japanese Patent Application Publication 2008-118918, a process of forming a large number of tapered portions and grooves on the skirt portion of the spool is necessary. Therefore, not only the costs increase but also it is required to enlarge the skirt of the spool by an amount corresponding to the line safety guard, which makes it difficult to downsize the spool and miniaturize the reel as well.

Further, in the line safety guard discussed in Japanese Patent No. 3761490, the outer peripheral surface of the second annular portion is configured to be substantially coplanar with the outer peripheral surface of the skirt portion. According to such a configuration, a circumferential gap G between the rear end face and the wall-like portion of the skirt portion is open radially outward along the entire periphery thereof. The circumferential gap G is open on a circumferential surface substantially parallel to a circumferential surface of the spool around which the fishing line is wound. Therefore, even if the gap is narrow, the fishing line may enter the gap and get entangled.

Further, in the line safety guard discussed in Japanese Patent No. 3761490, the line safety guard rotates together with the rotor while keeping the slight circumferential gap G with respect to the spool. However, the line safety guard and the spool contain a labyrinth structure therebetween. When the rotational axis of the line safety guard wobbles for example, the spool and the line safety guard may come into contact with each other and affect the rotation performances.

Further, in the line safety guard discussed in Japanese Patent No. 3761490, the second annular portion is exposed largely from the skirt portion of the spool. In general, the spool and the line safety guard are made of different materials and accordingly they differ from each other in appearance, which is not desirable in terms of designability.

The present advancement was made to solve the above-mentioned problems, and aims to provide a spinning reel for fishing including a line safety guard that can effectively prevent a fishing line from entering inside of a spool.

A spinning reel for fishing according to the present disclosure includes: a rotor including a cylindrical portion, and a pair of support arms protruding from the cylindrical portion and supporting a bail arm; a spool supported by a spool shaft and including a bobbin trunk, a front flange and a rear flange disposed on front and rear ends of the bobbin trunk respectively, the spool to move reciprocally in an axial direction of the spool shaft in accordance with rotation of the rotor; and a line safety guard configured to prevent entry of a fishing line into the spool. The line safety guard includes: a base end portion supported by the spool shaft so as to be rotatable around the spool shaft and movable together with the spool in the axial direction of the spool shaft; connecting frames proximally extending radially outward from the base end portion; and an annular portion consecutively connected to distal ends of the connecting frames. The annular portion has an outer peripheral surface that is disposed to face an inner peripheral surface of the rear flange, and a gap is open in the axial direction of the spool shaft between the inner peripheral surface of the rear flange and the outer peripheral surface of the annular portion.

According to the spinning reel for fishing having the above-mentioned features, the annular portion of the line safety guard faces the inner peripheral surface of the rear flange including a skirt portion of the spool, but does not radially protrude. Therefore, the gap formed between the rear flange of the spool and the line safety guard is open rearward in the axial direction of the spool shaft, instead of being open radially outward on a circumferential surface that is substantially parallel to the bobbin trunk of the spool, around which the fishing line is wound. Therefore, effectively preventing the fishing line from entering inside of the spool during a fishing operation is feasible.

Further, according to another aspect of the present disclosure, the annular portion has a circumferential groove formed on the outer peripheral surface so as to extend in a circumferential direction thereof. With the configuration, even if the fishing line enters the gap between the annular portion of the line safety guard and the rear flange of the spool, the fishing line can be caught by the circumferential groove so that the fishing line can be prevented from entering inside of the spool beyond the circumferential groove.

Further, according to another aspect of the present disclosure, the annular portion has a rear end face that is located rearward of a rear end face of the rear flange of the spool. With the above configuration, restraining the fishing line from entering toward the cylindrical portion of the rotor is feasible.

Further, according to another aspect of the present disclosure, the annular portion has an engaging portion that protrudes radially outward therefrom and is to be engaged with at least one of the support arms of the rotor. With the above configuration, the fishing line can be caught by the engaging portion extending to the support arm of the rotor, and the fishing line can be restrained from moving further rearward.

Further, according to another aspect of the present disclosure, the rear flange has a groove portion extending on the outer periphery in a circumferential direction thereof. With the above configuration, the fishing line that has moved rearward of the bobbin trunk beyond the rear flange is engaged with the groove portion, which restrains the fishing line from moving further rearward.

According to the present disclosure, a spinning reel for fishing can be provided that includes a line safety guard capable of effectively preventing a fishing line from entering inside of a spool.

DETAILED DESCRIPTION OF EMBODIMENTS

Embodiment

A spinning reel 10 for fishing according to an embodiment of the present disclosure will be described in detail below with reference to attached drawings.

Figure 1:
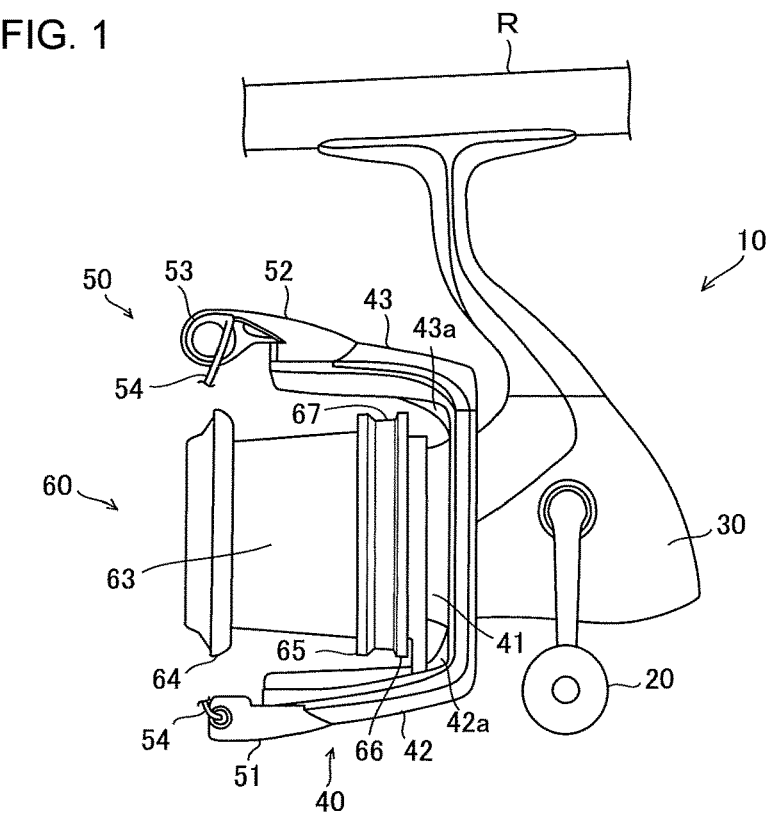
FIG. 1 is a side view illustrating a spinning reel according to an embodiment of the present disclosure.
Figure 2:
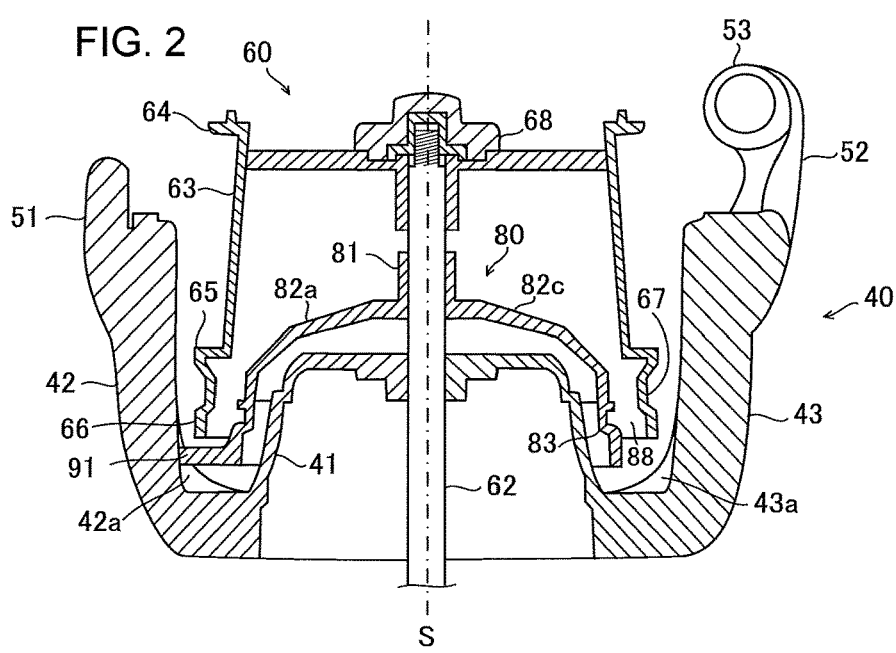
FIG. 2 is a cross-sectional view illustrating a rotor and a spool of the spinning reel illustrated in FIG. 1.

The spinning reel 10 is configured to be attached to a fishing rod R, and as illustrated in FIGS. 1 and 2, includes a reel body (housing) 30 with a handle 20, a rotor 40 rotatably supported by a front portion of the reel body 30, and a spool 60 disposed in front of the rotor 40 so that a fishing line can be wound around the spool 60. In the following description, unless otherwise stated specifically, the "front" indicates a direction along which the fishing line is drawn out (i.e., left direction in FIG. 1) and the "rear" indicates the reverse direction along which the fishing line is pulled back (i.e., right direction in FIG. 1). The "front" direction corresponds to the upward direction and the "rear" direction corresponds to the downward direction in FIG. 2.

The rotor 40 is a member operable to wind a fishing line around the spool 60. The rotor 40 is fixed to a front portion of a pinion gear (not illustrated), the gear being supported via a bearing so as to be rotatable around a spool shaft 62 disposed inside the reel body 30. When a user rotates a handle 20, the rotor 40 rotates around the spool shaft 62 integrally with the pinion gear. That is, the axis of a rotational shaft of the rotor 40 coincides with the axis S of the spool shaft 62.

The rotor 40 has a cylindrical portion 41, and a pair of support arms (rotor arms) 42 and 43 protruding, initially, radially outward from a rear end of the cylindrical portion 41, and then extending forward. The support arms 42 and 43 have ribs 42a and 43a on the inner sides respectively. A line safety guard 80, which is described in detail below, includes engaging portions 91 and 92 that can be engaged with the ribs 42a and 43a. A bail arm 50 configured to guide the fishing line is attached to the front ends of the support arms 42 and 43.

The bail arm 50 includes a bail 54 for guiding a fishing line, a line guide mechanism 53, a first bail support 51, and a second bail support 52. The bail 54 has one end connected to the first bail support 51 and the other end of the bail 54 is connected to the second bail support 52 via the line guide mechanism 53. The support arm 42 of the rotor 40 swingably supports the first bail support 51 of the bail arm 50, and the support arm 43 of the rotor 40 swingably supports the second bail support 52.

The spool 60 is a member around which a fishing line guided by the line guide mechanism 53 is wound. As illustrated in FIG. 2, the spool 60 is screwed to a front end of the spool shaft 62 by means of a screw 68. The spool shaft 62 is synchronized with the rotation of the rotor 40, and moves reciprocally in the direction of the axis S of the spool shaft 62 (namely, in the back and forth direction) according to an oscillating mechanism (not illustrated) disposed inside the reel body 30. In the movement, the spool 60 moves reciprocally together with the spool shaft 62 in the back and forth direction.

The spool 60 has a bobbin trunk 63 around which a fishing line is wound, a front flange 64 disposed on the front end of the bobbin trunk 63, and a rear flange 65 disposed on the rear end of the bobbin trunk 63.

The front flange 64 rises radially outward from the front end of the bobbin trunk 63, and the outer diameter of the front flange 64 is larger than that of the front end of the bobbin trunk 63. The rear flange 65 rises radially outward from a rear end of the bobbin trunk 63, and the outer diameter of the rear flange 65 is greater than the diameter of the rear end of the bobbin trunk 63. The rear flange 65 has a cylindrical portion (i.e., skirt portion) 66 extending rearward. The cylindrical portion 66 has an outer peripheral surface on which a groove portion (or tapered portion) 67 is formed so as to extend in a circumferential direction thereof.

Forming the front flange 64 and the rear flange 65 to have their outer diameters larger than that of the bobbin trunk 63 prevents the fishing line wound around the bobbin trunk 63 from moving forward or rearward of the bobbin trunk 63 (hereinafter, also referred to as "line drop").

Inside the spool 60, the line safety guard 80 is disposed. The line safety guard 80 is a member that, when a fishing line drops beyond the rear flange 65, prevents the line from entering further inside of the spool 60.

Figure 3A:
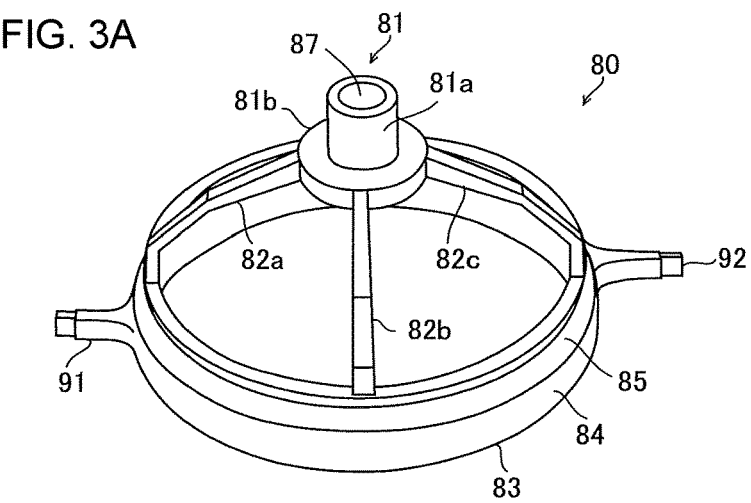
FIG. 3A is a perspective view illustrating a line safety guard of the spinning reel illustrated in FIG. 1.
Figure 3B:
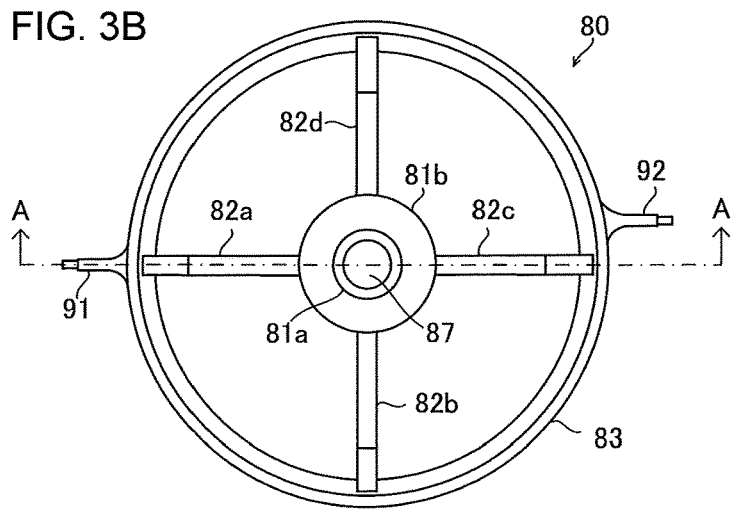
FIG. 3B is a top view of the line safety guard.
Figure 3C:
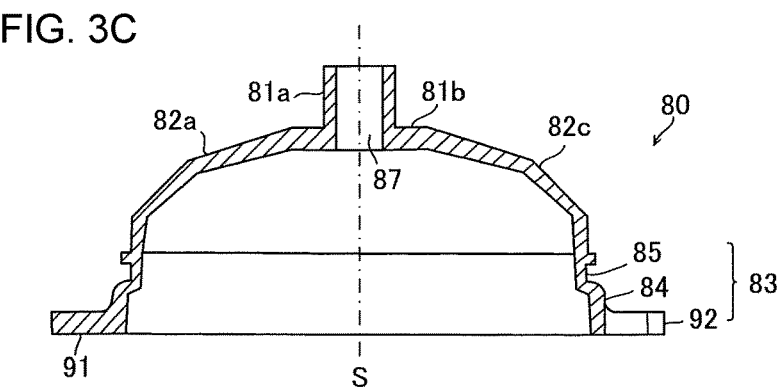
FIG. 3C is a cross-sectional view of the line safety guard taken along a line A-A of FIG. 3B.

The line safety guard 80, as illustrated in FIG. 3, has a base end portion 81, four connecting frames 82 (82a, 82b, 82c, and 82d) extending radially outward from the base end portion 81, and an annular portion 83 consecutively connected to ends of the connecting frames 82.

The base end portion 81 is supported by the spool shaft 62 in such a manner that the base end portion 81 is rotatable around the spool shaft 62 and movable together with the spool 60 in the direction of the axis S of the spool shaft 62. The base end portion 81 has a columnar portion 81a with an axial bore 87 which the spool shaft 62 can go through, and a frame support portion 81b located on the rear end of the columnar portion 81a and having a larger diameter than that of the rear end of the columnar portion 81a. The annular portion 83 has a cylindrical wall portion 84, a circumferential groove 85 extending on an outer periphery of the wall portion 84 in the circumferential direction, and the engaging portions 91 and 92 radially protruding from two locations on the wall portion 84.

Each of the four connecting frames 82 has a first portion extending radially outward from the frame support portion 81b and a second portion extending downward from the first portion so as to be connected to an upper portion of the annular portion 83. The four connecting frames 82a, 82b, 82c, and 82d are arranged at intervals of 90 degrees. Supporting the annular portion 83 with the four connecting frames 82 at equal intervals enables the line safety guard 80 to have a light weight and to rotate stably. Note that the total number of the connecting frames 82 is not limited to four. For example, two or three connecting frames can be arranged at equal intervals.

The line safety guard 80 is supported by the spool shaft 62 at the base end portion 81, so that the line safety guard 80 moves together with the movement of the spool shaft 62 back and forth. At the same time, since the engaging portions 91 and 92 are engaged with the ribs 42a and 43a located on the sides of the support arms 42 and 43 of the rotor 40 respectively, the line safety guard 80 rotates as the rotor 40 rotates. Thus, the engaging portions 91 and 92 are examples of a means for engaging with the support arms 42 and 43 and, more particularly, with the ribs 42a and 43a.

Figure 4A:
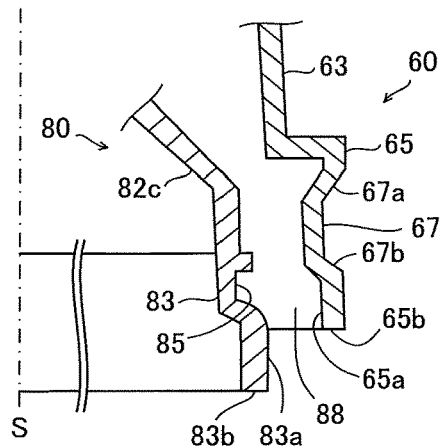
FIG. 4A is an enlarged view illustrating an opposing section where the line safety guard and a rear flange of the spool face each other.

As illustrated in FIG. 4A, the annular portion 83 (especially, the cylindrical wall portion 84 thereof) is disposed inside of the rear flange 65 of the spool 60, so that a portion of the annular portion 83 faces an inner peripheral surface 65a of the rear flange 65. There is formed a gap 88 between the outer peripheral surface 83a of the annular portion 83 and the inner peripheral surface 65a of the rear flange 65 of the spool 60. The gap 88 is open rearward in the direction of the axis S of the spool shaft 62. Since a fishing line is wound in the circumferential direction, the fishing line that has dropped backward beyond the rear flange 65 readily moves in the radial direction, but hardly enters the gap 88 that is open in the direction of the axis S of the spool shaft 62. Accordingly, effectively preventing the fishing line from entering inside of the spool 60 during a fishing operation is feasible. Thus, the annular portion 83 is an example of a means for preventing the fishing line from entering inside of the spool 60 during a fishing operation. It is desired that the gap 88 is set as small as possible to the extent that rotational swing of the line safety guard 80 will not bring the line safety guard 80 into contact with the spool 60.

Further, according to the above-mentioned configuration, there is no portion protruding radially outward from the annular portion 83. Therefore, the gap 88 includes no portion that is bent at a right angle (no labyrinth structure). Therefore, even if the rotational swing occurs when the line safety guard 80 rotates, there is little risk that the line safety guard 80 is brought into contact with the spool 60. Further, the annular portion 83 of the line safety guard 80 is exposed from the rear flange 65 of the spool by only a small amount, making the annular portion 83 less noticeable and enhancing the designability.

With respect to the outer peripheral surface 83a of the annular portion 83 where the engaging portions 91 and 92 are provided, a gap is located to be open radially outward. However, because the engaging portions 91 and 92 fill only a small region in the entire circumference of the annular portion 83, they cause no substantial effect.

The annular portion 83 has a rear end face 83b that is located rearward of a rear end surface 65b of the rear flange 65 of the spool 60. More specifically, the annular portion 83 (especially, the cylindrical wall portion 84 thereof) protrudes rearward farther than the rear flange 65. Such a configuration can prevent the fishing line from entering toward the cylindrical portion 41 of the rotor 40.

The annular portion 83 of the line safety guard 80 includes the circumferential groove 85 extending on the outer peripheral surface 83a in the circumferential direction. Therefore, even if the fishing line enters the gap 88, the fishing line can be caught by the circumferential groove 85, restraining the fishing line from entering deeply inside of the spool. Thus, the circumferential groove 85 is an example of a means for catching the fishing line.

Further, the rear flange 65 of the spool 60 includes a groove portion 67 extending on the outer peripheral surface 65 in the circumferential direction thereof. Even when the fishing line moves rearward of the bobbin trunk 63 beyond the rear flange 65, the fishing line is caught by the groove 67. Therefore, the fishing line will be restrained from moving further rearward. Thus, the groove 67 is an example of a means for restraining the fishing line from moving rearward. In the groove 67, a front rising portion 67a and a rear rising portion 67b are arranged inclined, but these rising portions 67a and 67b can be configured to rise in parallel with each other in the radial direction.

Modified Embodiment

Figure 4B:
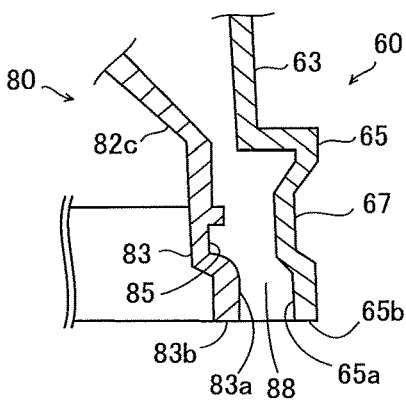
FIG. 4B illustrates a modified embodiment of the opposing section.

In the above-mentioned embodiment, as illustrated in FIG. 4A, the rear end face 83b of the annular portion 83 of the line safety guard 80 is located rearward of the rear end surface 65b of the rear flange 65 of the spool 60. However, the configuration is not limited thereto, and as illustrated in FIG. 4B, the line safety guard 80 according to a modified embodiment can include the rear end face 83b of the annular portion 83 located substantially at the same axial level as that of the rear end surface 65b of the rear flange 65. Alternatively, as another modified embodiment, the rear end face 83b of the annular portion 83 can be positioned forward of the rear end surface 65b of the rear flange 65. In this case, the engaging portions 91 and 92 can be configured to initially protrude rearward of the rear end face 83b of the annular portion 83 and then extend radially outward. With such configurations, the annular portion 83 is hardly visible from the outside while the function of preventing the fishing line from dropping can be secured, and the line safety guard 80 can be provided with an unnoticeable external appearance.

Figure 4C:
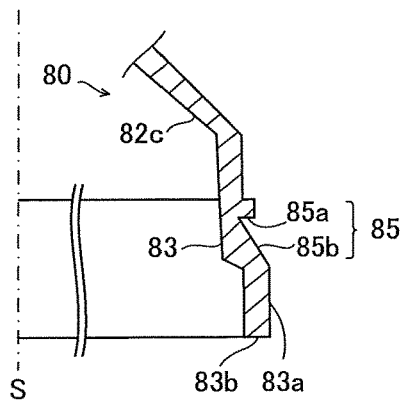
FIG. 4C illustrates a modified embodiment of a circumferential groove on the line safety guard.
Figure 4D:
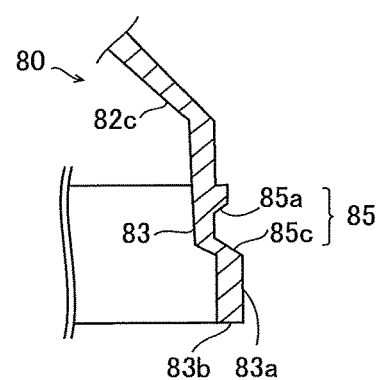
FIG. 4D illustrates a modified embodiment of the circumferential groove.

The shape of the circumferential groove 85 extending on the annular portion 83 of the line safety guard 80 is not limited specifically. For example, as illustrated in FIG. 4C, the circumferential groove 85 can be constituted by a front portion rising radially as a rising portion 85a and a rear portion inclined as a tapered surface 85b. Alternatively, as illustrated in FIG. 4D, the circumferential groove 85 can be constituted by an inclined front rising portion 85a and an inclined rear rising portion 85c.

Figure 5:
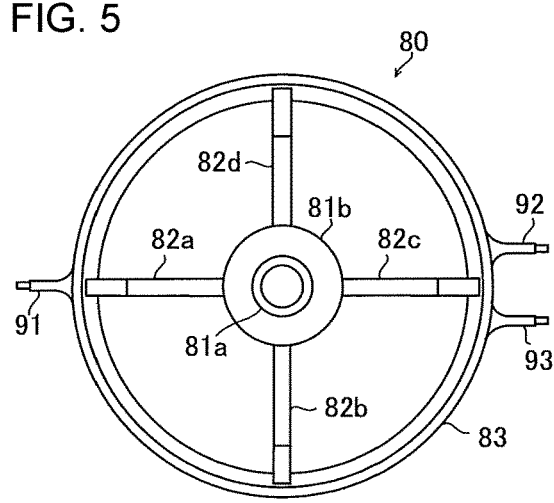
FIG. 5 illustrates a modified embodiment of the line safety guard, which includes an increased number of engaging portions.

According to the above-mentioned embodiment, the engaging portions 91 and 92 of the line safety guard 80 are configured to engage with the support arms 42 and 43, respectively. However, the configuration is not limited thereto, and a modified embodiment can include two engaging portions 92 and 93 that are configured to be engaged with the support arm 43 as illustrated in FIG. 5. Alternatively, two engaging portions 91 configured to be engaged with the support arm 42 can be provided. The above-mentioned configurations can further stabilize rotation performance of the line safety guard 80 that rotates with the rotor 40. Conversely, although not illustrated, one of the engaging portions 91 and 92 can be omitted. This configuration can reduce the space portion that is open radially outward in the gap 88 between the line safety guard 80 and the spool 60.

REFERENCE SIGNS LIST

10 Spinning reel
20 Handle
30 Reel body
40 Rotor
41 Cylindrical portion
42, 43 Support arm
42A, 43A Rib
50 Bail arm
51 First bail support
52 Second bail support
53 Line guide mechanism
54 Bail
60 Spool
62 Spool shaft
63 Bobbin trunk
64 Front flange
65 Rear flange
65a Inner peripheral surface (of rear flange)
65b Rear end surface (of rear flange)
66 Cylindrical portion
67 Groove portion
67a, 67b Rising portion
68 Screw
80 Line safety guard
81 Base end portion
81a Columnar portion
81b Frame support portion
82 (82A, 82B, 82C, 82D) Connecting frame
83 Annular portion
83a Outer periphery (of annular portion)
83b Rear end face (of annular portion)
84 Wall portion
85 Circumferential groove
85a Front rising portion
85b, 85c Rear rising portion
87 Axial bore
88 Gap
91, 92, 93 Engaging portion

What is claimed is:

1. A spinning reel for fishing, comprising:
a rotor including a cylindrical portion and a pair of support arms protruding from the cylindrical portion and supporting a bail arm;
a spool supported by a spool shaft and including a bobbin trunk, a front flange and a rear flange disposed on front and rear ends of the bobbin trunk respectively, the spool to move in accordance with a rotation of the rotor reciprocally in an axial direction of the spool shaft; and
a line safety guard configured to prevent entry of a fishing line into the spool,
the line safety guard including
a base end portion supported by the spool shaft so as to be rotatable around the spool shaft and movable together with the spool in the axial direction of the spool shaft;
connecting frames proximally extending radially outward from the base end portion; and
an annular portion consecutively connected to distal ends of the connecting frames, the annular portion having an outer peripheral surface that is disposed to face an inner peripheral surface of the rear flange with a gap between the inner peripheral surface of the rear flange and the outer peripheral surface of the annular portion, the gap being open in the axial direction of the spool shaft, wherein
the annular portion has a circumferential groove extending on the outer peripheral surface in a circumferential direction of the annular portion.

2. The spinning reel for fishing according to claim 1, wherein the annular portion has a rear end face that is located rearward of a rear end surface of the rear flange of the spool.

3. The spinning reel for fishing according to claim 1, wherein the annular portion has an engaging portion that protrudes radially outward therefrom and is to be engaged with at least one of the support arms of the rotor.

4. The spinning reel for fishing according to claim 3, wherein one of the connecting frames extends in a longitudinal direction, the engaging portion extends in the longitudinal direction, and the engaging portion is offset from the one of the connecting frames in a direction perpendicular to the longitudinal direction.

5. The spinning reel for fishing according to claim 4, wherein the annular portion has another engaging portion that is offset from the one of the connecting frames in a direction opposite to the direction perpendicular to the longitudinal direction.

6. The spinning reel for fishing according to claim 1, wherein the circumferential groove includes a front portion rising radially and a rear portion inclined as a tapered surface.

7. The spinning reel for fishing according to claim 1, wherein the circumferential groove includes an inclined front rising portion and an inclined rear rising portion.

* * * * *